Figure 1:
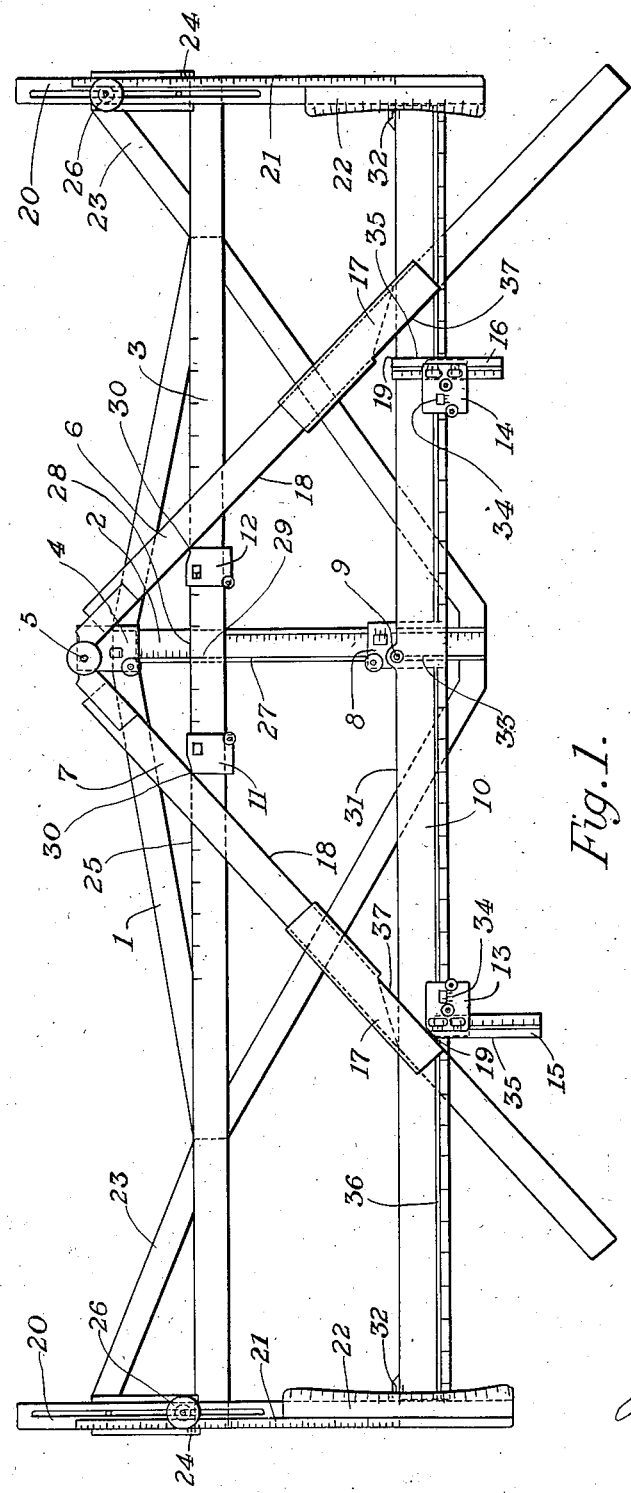

Sept. 1, 1936.　　　　J. W. BAGLEY　　　　2,053,019
AERIAL PHOTOGRAPH CALCULATOR
Filed May 5, 1934　　　2 Sheets-Sheet 1

Inventor
James W. Bagley

Sept. 1, 1936.   J. W. BAGLEY   2,053,019
AERIAL PHOTOGRAPH CALCULATOR
Filed May 5, 1934   2 Sheets-Sheet 2

Inventor
James W Bagley

Patented Sept. 1, 1936

2,053,019

UNITED STATES PATENT OFFICE 2,053,019

AERIAL PHOTOGRAPH CALCULATOR

James Warren Bagley, Fayetteville, Tenn.

Application May 5, 1934, Serial No. 724,189

2 Claims. (Cl. 33—1)

My invention relates to a mechanical calculator for use with aerial photographs to determine the elevations of objects pictured, the degree and axis of tilt of aerial photographs with reference to datum planes and the heights at which aerial photographs were taken; and has for its object the obtaining of data useful for finding slopes of land features, contouring maps, delineating land forms and calculating heights of airplanes in flight.

The calculator is chiefly useful to facilitate the making of standard topographic maps, the elevation data obtained with it supplementing control data obtained by the usual methods of surveying on the ground. Measurements taken from aerial photographs are combined on the calculator with measurements made on a map plotting sheet to obtain additional data required to prepare and complete the map. Measurements on aerial photographs likewise may be combined with actual measurements on the ground to obtain useful hypsometric data. The calculator may be used with all types of aerial photographs, whether obtained with single-lens or multi-lens cameras, the requisite being that photographs employed must either include a certain number of control points, known as to horizontal position and elevation, or themselves provide the means first of locating and finding the elevations of a sufficient number of objects for control use, as by working from two or more photographs to another photograph, all embracing common terrain.

The instrument is devised and designed on those principles of plane geometry which are employed in the solution of triangles and the well known three-point problem of surveying, the triangles concerned being included in planes which are perpendicular to the photograph and cut through its center, the apex of the triangles being at a distance from the photograph equal to its focal length and on the line perpendicular to the photograph at its center.

The calculator is an assembly of two scales that are rigidly joined together at right angles to each other, a scale mounted on a pivot which is adjustable with respect to the two joined scales, two diagonal straight arms mounted on a common pivot which is adjustable with respect to the two joined scales, two graduated circular arcs suitably disposed to measure the swing of the pivoted scale with respect to the two joined scales and slides movable along the scales and straight arms, two of the slides carrying slideable auxiliary scales, all of the above-mentioned parts being brought together into a relationship and in a manner to permit the making of settings necessary for the purposes recited above.

Figure 3:
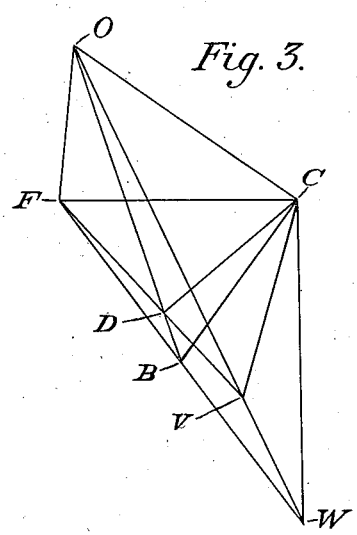
Figure 2:
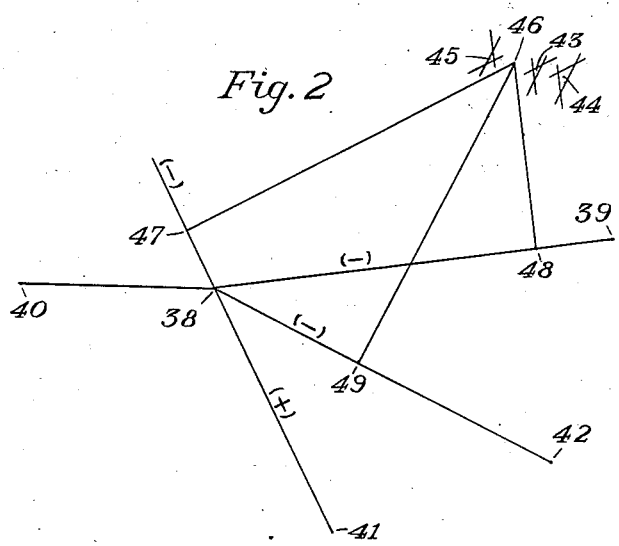
Figure 4:
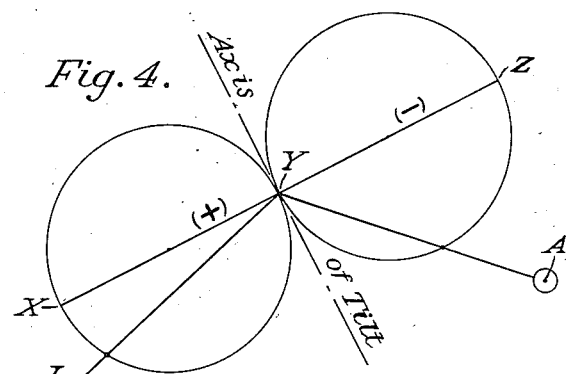
Figure 5:
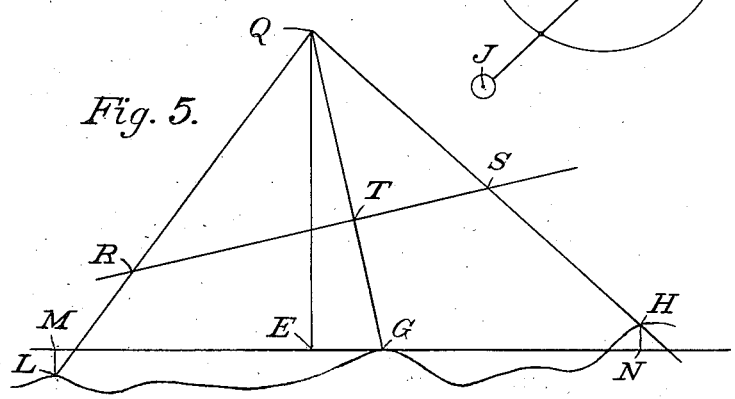

Figure 1 is a plan view of a design of the calculator. Figure 2 is a drawing which shows data taken from an aerial photograph to determine graphically the degree of tilt of the photograph and the axis of tilt in connection with use of the calculator. Figure 3 is a drawing used in deducing a formula which expresses in simple terms the relationships between a tilted photograph and the horizontal plane through its center. Figure 4 is a diagram which shows how the tilt formula, deduced in connection with Figure 3, may be graphically employed with the calculator. Figure 5 is a diagrammatical drawing which shows the relationships between an aerial photograph, a map plotting sheet of the terrain embraced by the photograph and the basis for employing the calculator.

More specifically Figure 1 comprises a base member serving to hold rigidly together a focal distance scale 2 and a photo scale 3, which are joined accurately at right angles to each other. Mounted on the focal distance scale are two slides, one of which 4 carries a pivot 5 about which two diagonal straight arms 6 and 7 swing and the other 8 carries a pivot 9 about which a map scale 10 swings. Each of the two slides has a vernier for making accurate settings of the respective pivots. The photo scale 3 carries two slides, 11 and 12, for the purpose of affording stops for the two pivoted straight arms 6 and 7. The map scale 10 carries two slides, 13 and 14, each of which carries a sliding elevation scale 15, 16. Verniers and clamps permit these slides and their scales to be accurately set as required. Each of the straight arms, 6 and 7, carries a free slide 17 whose purpose is to extend upward the plane of the significant face 18 of each straight arm so that the significant corner edge 19 of scales 15 and 16 may be accurately brought into contact with those respective planes.

The photo scale 3 is made long enough to mount at each end a slotted bar 20 which carries a scale 21 and a graduated circular arc 22, the arrangement being such that the circular arc overhangs the end of the map scale suitably to read the amount of its swing. A stand 23 serves to connect the slotted bar properly to the photo scale and to raise it to the proper height. The scale 21 and its vernier 24 serve to make accurate settings of the index of the circular arc with respect to the significant face 25 of the photo scale. The clamp screw 26 holds the slotted bar in position.

The focal distance scale is carefully made with its edges straight and parallel to one another and its adjacent faces perpendicular to one another. It is securely fastened to the base plate. A "center line" 27 is scribed on it parallel to its longitudinal edges and extends through its entire length. An index line 28 is scribed across it at right angles to the "center line". For convenience, the focal distance scale has two sets of graduation lines which commence at the index line and extend to the opposite ends. One set serves for accurately placing the axis of the pivot of the two diagonal straight arms at any desired distance from the index line; the other for placing the axis of the map scale pivot with respect to the same index line. For convenience in making these respective setting the numbering of each set of graduation lines starts at the index line with the figure which is the amount of displacement of each slide vernier from its respective pivot axis, the displacements being purposely made an even number of the scale units. The two pivot slides 4 and 8 are carefully constructed and fitted so that the pivot axes always remain exactly over the "center line" 27 or its prolongation when the slides are set in position for use.

The photo scale 3 is carefully made with its edges straight and parallel to one another and its adjacent faces perpendicular to one another. It is mounted on the base plate with its significant face 25 exactly on the index line 28 of the focal distance scale and accurately at right angles to the "center line" 27. An index line 29 is scribed on it at right angles to the significant face 25, and this index line falls exactly over the "center line". Graduation lines commence at this index line and extend far enough in each direction to afford the required range in placing the diagonal straight arms 6 and 7. For convenience, the numbering of the graduation lines starts at the index line 29 with the figure which is the amount of displacement of the verniers of the slides 11 and 12 from the significant corner edges 30 of the slides, and extends outward in each direction, the verniers being purposely displaced an even number of scale units for the purpose. The photo scale may be permanently fastened to the base plate with pins and screws or removably mounted with dowels.

The map scale 10 is carefully made with its edges straight and parallel to one another and its adjacent faces perpendicular to one another. It is widened near the middle to form a pivot socket whose axis is exactly in the plane of the significant face 31, and at each end to afford sufficient surface for a double vernier 32, the line of the significant face being scribed along the end surfaces to serve as index lines of the verniers. An index line 33 is scribed across the map scale at right angles to the significant face 31 to pass prolonged exactly through the axis of the pivot 9. Graduation lines of the map scale commence at index line 33 and extend in both directions to the ends. The numbering of the graduation lines starts at this index line with the figure which is the amount of displacement of the verniers 34 from the outer surfaces 35 of the scales 15 and 16, the displacements purposely being made an even number of units of the map scale. A longitudinal groove 36 extends from end to end of the scale. It serves as a track for the slides 13 and 14 and being placed close to the outer upright surface of the map scale, permits the slides to be placed some distance from the significant face 31.

The elevation scales 15 and 16 provide for making accurate measurements between the plane of the significant face 31 of the map scale and the plane of the significant face 18 of each respective diagonal straight arm, these measurements being made in the plane of the outer upright surface 35 of each respective elevation scale. Each elevation scale has a longitudinal groove extending its entire length to afford a bearing surface for a guide and to permit the scale to be held securely in position with its outer upright surface 35 clear of the plate on which the scale rests. The elevation scales are carefully constructed with their longitudinal edges parallel to one another and adjacent faces perpendicular to one another. They are graduated at the scale of the map plotting sheet with which they are to be used, a pair being provided for each different scale of plotting required, proper regard being given to have the index of each vernier concerned give a correct reading with reference to the upright corner edge 19.

To assure accurate results with the calculator the following relationships are established and maintained with exactitude: perpendicularity between the significant face 25 of the photo scale and the "center line" 27 of the focal distance scale; coincidence of the lower edge of the significant face 25 of the photo scale with the index line 28 of the focal distance scale; coincidence of the axis of the diagonal straight arm pivot 5 and of the axis of the map scale pivot 9 with the vertical plane which includes the "center line"; coincidence of the significant corner edge 30 of each photo scale slide with the plane of the significant face 25 of the photo scale; coincidence of the significant face 37 of each diagonal straight arm slide 17 with the plane of the significant face 18 of its straight arm; perpendicularity between the outer surface 35 of each elevation scale 15 and 16 with the significant face 31 of the map scale; parallelism between the index line of each circular arc 22 and the significant face 25 of the photo scale; perpendicularity between the longitudinal edges of the slotted bars 20 and the plane of the significant face 25 of the photo scale; parallelism of the "center line" 27 to the longitudinal edges of the focal distance scale 2; parallelism with each other of the bearing surfaces of the guides of each slide and with the surfaces they bear against; perpendicularity of graduation lines of all straight scales to the longitudinal edges of the scales; and placement of the indices of verniers at even scale units from the significant part each vernier is to be used to set.

The graduations of the focal distance scale 2, the photo scale 3, the map scale 10, and the slotted bar scales 21 will ordinarily be in a standard unit such as millimeters or inches. The elevation scales 15 and 16 will be graduated to read feet or meters at the scale of the map to be prepared, as for example 1:20000, or 1:10000. The graduations of the circular arcs 22 are in minutes of arc, the lines being spaced 5 minutes apart and the verniers 32 arranged to give readings to even minutes. The index lines of the photo scale and the map scale are decentered a little to afford a somewhat greater range of readings with the calculator when dealing with photographs that are greatly tilted. The dimensions of the parts are made great enough to give a wide range of usefulness with aerial photographs varying in scale and type and maps of various scales.

The calculator is employed in the following manner: The pivot 5 is set at a distance from the significant face 25 of the photo scale equal to the focal length of the photograph. Referring now to Fig. 2 which represents an aerial photograph, or a tracing of points from an aerial photograph, it is assumed that its center 38 and four other points such as 39, 40, 41, and 42 are known as to relative position and elevation and have been located on a plotting sheet. Two of the control points selected for use must be on opposite sides of and approximately in line with the center as is the case with 39 and 40. The two distances 38—39 and 38—40 are measured with a scale having the same units as the photo scale of the calculator. These two distances are laid off on the photo scale, one to the right, (for example, 38—39) and the other to the left, the slides 11 and 12 of Fig. 1 being set accordingly. The straight arms 6 and 7 are swung into contact with the significant edges 30 of the slides. The distances on the plotting sheet corresponding to 38—39 and 38—40 are measured and laid off on the map scale, the former to the right, the latter to the left, and the slides 13 and 14 set accordingly. The elevation scale 16 (right) is set at the difference between the elevation of the center 38 and of the point 39 and the elevation scale 15 (left) is set at the difference between the elevation of the center 38 and of the point 40. While the slides 13 and 14 and the elevation scales are being thus set, the map scale rests in a position near the end of the focal distance scale where the diagonal straight arms do not interfere. The clamp of the slide 8 is now released and the slide is pushed toward the photo scale carrying the map scale with it, and as the elevation scales approach near to the straight arms 6 and 7 the slides 17 are pushed along into position where their significant faces 37 will catch the significant corners 19 of the elevation scales and stop the movement. The movement is continued until contact is made, care being taken not to disturb the setting of the arms 6 and 7. The slide 8 is now clamped and its vernier read to obtain the distance between the axis of the pivot 9 and the significant face 25 of the photo scale. The slotted bars are set to place the index line of each circular arc 22 at that same distance from the significant face 25 of the photo scale. A reading in minutes is made on each circular arc, and, if all settings have been made without error, the angle read on one arc will equal the angle read on the other arc. These angular readings will show (unless the angle is zero) that on one side the map scale is converging toward the photo scale and on the other side it is diverging from the photo scale. For convenience in distinguishing between these the reading on the converging side will be designated by a minus sign and that on the diverging side by a plus sign. By thus employing the calculator an approximate solution has been made of the common three-point problem of surveying, the instrument station in this case being the aerial position from which the photograph was taken instead of the usual instrumental station on the ground. The solution is, however, subject to error depending on the departure from a straight line of the positions of the three points, 38, 39, and 40.

Leaving the slide 8 and the circular arcs set as they are, the straight arms are swung back out of the way and the distance 38—41 as measured on the photograph is laid off on the photo scale either on the right side or the left, as desired, and the stop slide set accordingly, the straight arm on that side then being swung into contact with the corner edge 30. The map distance 38—41 is laid off on the map scale to correspond and the elevation scale set at the difference between the elevation of 38 and of 41. The map scale is swung until contact between 19 and 37 is made and the angle then read on the circular arc. This angle will be the approximate tilt along the line 38—41. Still leaving the slide 8 set as before similar measurements and settings are made to determine the angle of tilt along the line 38—42. The position of the map scale pivot on the focal distance scale and the three angle readings obtained from these settings are recorded, the angles being given the proper plus or minus sign.

At this juncture of the procedure a graphical step is employed to correlate the data thus far obtained so that more accurate determinations of the three recorded angles of tilt may be made and from them the axis and amount of tilt of the photograph found. Referring again to Fig. 2, a line is drawn from 38 to each of the other three points and if necessary prolonged beyond them. At an appropriate scale the above determined approximate angles of tilt are laid off from 38, each along its respective line and a perpendicular erected there to each line. These perpendiculars converge and at crossing one another form a triangle, which will be small or large depending on the size of the errors in the approximate values of the tilt angles laid off. If the three points, 38, 39, and 40 are very nearly in a straight line the errors in the tilt angles will be small and the triangle formed by the perpendiculars will be small. Moreover the distance from the triangle to the center 38 measured by the scale used for laying off the three approximate angles of tilt will be a close approximation to the tilt of the photograph and the line drawn through 38 perpendicular to the line from 38 to the triangle will be the approximate axis of tilt. If the three points 38, 39, and 40 are far from being on a straight line the triangle of the perpendiculars will be large, for the errors in determining the angles of tilt along the three lines from 38 will be relatively large. These errors arise from the fact that unequal distortions along two lines of the photograph, 38—39 and 38—40 were used as if they occurred along the one line 38—39 and consequently in setting the map scale the pivot was not placed at its proper position. If therefore additional approximate readings of the angles of tilt along the three lines 38—39, 38—41 and 38—42 are made on the calculator in turn with the pivot of the map scale set first a certain small distance nearer, then the same distance farther from, the photo scale than at the original setting, new values for the angles of tilt will be obtained which, if plotted on the tracing as the first values were plotted and corresponding perpendiculars are drawn, two additional triangles will be formed, one each side of and near the first triangle. Three such triangles are shown at 43, 44 and 45, Fig. 2. Inspection of the triangles shows that they trend along a course and differ progressively in size. These characteristics of the triangles give sufficient information to quickly and accurately determine the axis and amount of tilt of the photograph, for by making a few additional readings on the calculator with the map scale pivot set progressively nearer or farther from the photo scale, as required to obtain smaller triangles at the crossings of the above-mentioned perpendiculars, it is possible to bracket the point at which the triangle dwindles to zero and the three perpendiculars intersect at a point. The distance of this point from the center, at the scale of the plotting of angle values, is the amount of tilt of the photograph and a line through the center at right angles to the line connecting the point with the center is the axis about which it is convenient to consider the photograph as tilted. The position of the map scale pivot at each of the additional readings is recorded.

It is not yet evident that the last mentioned distance as scaled from the tracing is the amount of tilt of the photograph. Proof that it is with sufficient accuracy for practical mapping purposes is established as follows:

Referring to Fig. 3: Let FC be the line of intersection of two planes, FCW and FCV, and through C pass a plane OCW perpendicular to FC. At C erect a perpendicular to the plane FCW and from O, a point in this perpendicular, drop a perpendicular OV to the plane FCV, prolonging it to meet plane FCW at W. Through OC pass a random plane OBC and through OV pass a plane OWF perpendicular to the plane OBC. Connect VC, WC, VF, WF, OB, BC, and DC, D being the point common to the three planes FCV, OBC and OWF. The angle VCW which will be designated $i$ is the dihedral angle between the two planes FCW and FCV and it equals the angle COW. Let $p$ designate the angle BCW and $k$ designate the angle DCB which equals the angle DOC. Since OCW is a right angle, $$OC = \frac{CW}{\tan i}$$

and as OCB is also a right angle, $$\tan k = \frac{BC}{OC}$$

Because plane OWF was made perpendicular to plane OBC, angle CBW is a right angle and $$BC = CW \cos p$$

Hence by substitution, $$\tan k = \cos p \tan i$$

C corresponds to the center of an aerial photograph, FCW, which is tilted through the angle $i$ to a horizontal plane, FCV. The angular value of that tilt along any other line of the photograph, which passes through the center C, may be found from the formula $$\tan k = \cos p \tan i,$$

which was deduced above. If neither the axis of tilt nor the dihedral angle of tilt of a photograph is known but the angular values of tilt along two random lines through its center are known, the axis and dihedral angle can be found from the formula in the form $$\tan i = \frac{\tan k}{\cos p},$$

in which case the problem is to find two unknown quantities from two simultaneous equations. The solution, however, involves a laborious computation, but inasmuch as here employed, $i$ being a constant, the equation $$\tan k = \tan i \cos p$$

is a general equation of the ellipse which for small values of $i$ approaches so close to that of the circle it is practically identical with the form $$k = i \cos p$$

and may be used for the present purpose in the transposed form, $$i = \frac{k}{\cos p},$$

and then the solution becomes a comparatively simple process if done graphically. It consists merely of plotting the lines in their relative positions, erecting perpendiculars to them at distances from their center of radiation equal to the angular value of tilt along each line and scaling the distance from the intersection of the perpendiculars to the center of radiation; for since it has been shown that the foot of each perpendicular is practically on the perimeter of a common circle, it follows that the intersection of the perpendiculars will fall on the same common circle whose diameter results from the plotting. It also follows that the axis of tilt at the center of radiation is the line at right angles to the line connecting the intersection of the perpendiculars with that center. Having thus demonstrated that which it was necessary to prove it remains only to state the axiom of the proposition which is: Given the axis and amount of tilt of a slightly tilted photograph the angular value of tilt (near enough for practical purposes) along any line through the center of the photograph is measured by the distance from the center to the intersection of the line with the perimeter of a circle drawn tangent to the axis and having as its diameter the value of the dihedral angle of tilt of the photograph.

Referring again to Fig. 2, the point 46 is at the intersection of the perpendiculars erected at 47, 48 and 49, these points being at the distances from the center 38 corresponding to the respective angular values of tilt. Any two of the perpendiculars fix the point 46; the third furnishes a check on its position. The distance 38—46 is the tilt of the photograph.

That setting of the map scale pivot of the calculator which by trial or by interpolation in the record is found to give an intersection of the three perpendiculars at a common point is the proper setting for determination of elevations of objects pictured. In using the calculator for this purpose, it is convenient to draw the tilt axis line on the photograph through its center, and having plotted at a convenient scale on a piece of transparent tracing paper or celluloid a plus and minus tilt circle, one opposite the other and each tangent to a common straight line, to superpose the transparent diagram on the photograph, the tangent point of the two circles resting on the center of the photograph and the common tangent line of the circles on the axis of tilt. The angular value of tilt along any line from the center to a point whose elevation is to be determined can then be quickly scaled. Fig. 4 shows the form of the double circle tracing described. XY and YZ are the diameters, on the perpendicular to the axis of tilt, of the two tangent tilt circles. A and J are any points of a photograph whose center is at Y.

The instrument provides the means for accurately setting an arm-carrying pivot at any desired distance from, and on a straight "center" line at right angles to, a fixed scale; for accurately laying off two adjacent angles, the pivot being their common apex, the "center" line their common inner limit and the pivot arms their respective outer limits; for bringing into coincidence with the "center" line and the proper straight edges of the two pivot arms three accurately related points; and thereupon for measuring the angle between the straight edge of the said fixed scale and the straight edge of a pivoted scale. The instrument is arranged so that when the above-mentioned settings are made they are equivalent to having the two angles and the three properly related points in the same plane. It therefore can be employed to lay off accurately two angles which are in a common plane and to solve the common three point problem by bringing into coincidence with the limits of those two angles any three points which are also in that common plane. With respect to an aerial photograph whose optical center and focal length are known, as is commonly the case in aerial photographic mapping, the instrument, having the characteristics explained above, may be used to lay off two adjacent angles in a particular plane embracing the optical axis of the photograph; and if the natural distances of any two pictured objects, also in that particular plane, are known with respect to the point where the optical axis pierces the ground and, if with respect to any datum plane, as for example sea level, the elevations of the two pictured objects and the foot of the optical axis are known, it is possible and practicable to determine with respect to the datum plane the tilt of the photograph along the line connecting the two pictured objects.

When a determination of tilt has been thus made, the two natural distances having been set at a convenient natural scale, the distance between the pivot of the pivoted scale and the arm-carrying pivot corresponds, at the natural scale used, to the distance of the camera from the foot of the optical axis at the instant of exposure in making the photograph. The fixed scale along the "center" line of the instrument may be read directly to obtain this pivot to pivot distance, which multiplied by the cosine of the angle of tilt and the natural scale number gives the elevation of the camera above the horizontal plane through the foot of the optical axis. Fig. 5 illustrates diagrammatically what is done in using the calculator as explained above. Q is the center of the camera lens which corresponds to a point on the axis of the pivot of the two diagonal straight arms of the calculator. RS is a line through the center of the photograph which corresponds to the significant face of the photo scale of the calculator. TR and TS are distances on the photograph from its center T to two pictured points R and S which are on a straight line through the center T and which have been laid off on the photo scale of the calculator. MN is a horizontal datum plane through the map position of the center point of the photograph whose position has been located at G on the map plotting sheet.

MGN represents the map plotting sheet, its datum plane being taken as the horizontal plane through G. The distances GM and GN are measured on the map plotting sheet and laid off on the map scale of the calculator, M and N being the respective map positions corresponding to the pictured points R and S. ML is the difference between the elevations of G and L and HN the difference between the elevations of G and H, as laid off on the elevation scales of the calculator at the scale of the map plotting sheet. LGH represents a profile of the terrain drawn at the scale of the map plotting sheet. RQT is the aerial angle at the center of the lens between the optical axis of the camera (or of the photograph) and the line to the pictured point R. TQS is the aerial angle between the optical axis and the line to the pictured point S. These two angles are limited by the two diagonal straight arms of the calculator which are represented in the diagram by the lines QR and QS. It is evident that if these two angles are accurately laid off on the calculator and the settings as explained above be made on the map scale and elevation scales and the significant parts brought into coincidence it will amount to establishing the relationships, with respect to the photograph and the points concerned, which obtained when the photograph was taken, the scale of the map plotting sheet being taken into consideration. The angle between the two straight lines RS and MN is the angle of tilt of the photograph along the line RS with respect to the horizontal plane through G.

The line MGN, which corresponds to the significant face of the map scale of the calculator, will come into a position such that QG accurately represents, at the scale of the map plotting sheet, the distance from the camera lens to the point where the optical axis pierced the ground. If the line RS be at right angles to the axis of tilt of the photograph and QE be drawn perpendicular to the line MGN it will measure, at the scale of the map plotting sheet, the height of the lens above the horizontal datum plane through G. The angle EQG will then equal the angle of tilt of the photograph because QE is perpendicular to MN and QT is perpendicular to RS.

Since the distance QG corresponds to the distance between the pivot of the diagonal straight arms and the map scale pivot of the calculator, by analogy the height of the camera lens above the horizontal datum plane, which passes through the point on the ground corresponding to the center of the photograph, is the product of the distance between the two said pivots multiplied by the denominator of the representative fraction of the map plotting sheet scale multiplied by the cosine of the angle of tilt of the photograph.

In using the calculator it is necessary to make corrections for curvature of the earth and refraction of the atmosphere if the photographs embrace wide expenses of terrain so that distances to be laid off on the map scale are great. These corrections are made by applying them with their proper signs to the settings of the elevation scales as for trigonometric leveling with surveying instruments from ground stations.

It is not intended to limit the calculator to the design shown by Fig. 1, but to include other arrangements of the essential parts, namely, the focal distance scale, the photo scale, the map scale, the diagonal straight arms, the graduated circular arcs and the elevation scales, which will bring them together in a proper manner to constitute an instrument of the general type indicated and be suitable to determine the elevations of objects pictured by aerial photographs, to determine angular tilt values along lines radial from the centers of photographs and to determine the heights at which aerial photographs were taken. For example, the necessary movements and settings could be provided by having the map scale pivoted on a bracket attached to a base plate, the circular arcs fixed to the base plate, and guides, or a track, fastened to the base plate for the purpose of sliding the focal distance scale along with respect to the pivot of the map scale, the focal distance scale carrying the photo scale and the two diagonal straight arms with it. The slides of the diagonal straight arms may be dispensed with by either raising the diagonal straight arms enough to pass over the map scale, the stops of the photo scale slides being elevated a like amount, or by arranging the elevation scales to pass under the map scale. The sharp corners of the elevation scales, which make contact with the significant faces of the diagonal straight arms, may be avoided by rounding these contact corners and offsetting the significant faces of the diagonal straight arms an amount equal to the radius of the rounded surface.

In making standard maps at the common scales employed, it is not necessary to know very accurately the elevation of the ground point which corresponds to the center of the photograph. Few "vertical" aerial photographs are tilted more than 3 degrees. An error of several feet in the elevation of the center ground point will not ordinarily cause an appreciable error in the results obtained from use of the calculator.

I claim:

1. An aerial photograph calculator consisting of a combination of a first and a second straight scale rigidly joined together at right angles, a third straight scale mounted on a pivot which is adjustable along the first of the two joined scales, two straight arms mounted on a common pivot which is adjustable along the first of the two joined scales, two graduated circular arcs which are disposed to measure the swing of the pivoted scale with respect to the second of the two joined scales, two slides movable along the second of the two joined scales and capable of being set accurately to place the two pivoted straight arms, two slides movable along the pivoted scale and capable of being set accurately with respect to the pivot of the pivoted scale, each of these slides carrying a small scale placed at right angles to the pivoted scale and capable of being set accurately with respect to a longitudinal edge of the pivoted scale.

2. An aerial photograph calculator consisting of a combination of a first and a second straight scale rigidly joined together at right angles, a third straight scale mounted on a pivot which is adjustable along the first of the joined scales, a straight arm mounted on a pivot which is adjustable along the first of the two joined scales, a graduated circular arc which is disposed to measure the swing of the pivoted scale with respect to the second of the two joined scales, a slide movable along the second of the two joined scales and capable of being set accurately to place the pivoted straight arm, a slide movable along the pivoted scale and capable of being set accurately with respect to the pivot of the pivoted scale and carrying a small scale which is placed at right angles to the pivoted scale and is capable of being set accurately with respect to a longitudinal edge of the pivoted scale.

JAMES WARREN BAGLEY.